United States Patent
Davey et al.

(10) Patent No.: US 8,145,007 B2
(45) Date of Patent: *Mar. 27, 2012

(54) IMAGE PROCESSING OF REGIONS IN A WIDE ANGLE VIDEO CAMERA

(75) Inventors: Mark Kenneth Davey, Beckenham (GB); Andrea Elvis Castellari, Horley (GB); Yavuz Ahiska, Esher (GB)

(73) Assignee: Grandeye, Ltd. (GB)

( * ) Notice: Subject to any disclaimer, the term of this patent is extended or adjusted under 35 U.S.C. 154(b) by 974 days.

This patent is subject to a terminal disclaimer.

(21) Appl. No.: 12/082,903

(22) Filed: Apr. 15, 2008

(65) Prior Publication Data

US 2008/0211903 A1 Sep. 4, 2008

Related U.S. Application Data

(63) Continuation of application No. 11/178,232, filed on Jul. 8, 2005, now Pat. No. 7,366,359.

(60) Provisional application No. 60/586,204, filed on Jul. 8, 2004.

(51) Int. Cl.
*H04N 7/00* (2011.01)

(52) U.S. Cl. ........... 382/274; 348/39; 348/143; 348/159

(58) Field of Classification Search .................. 382/100, 382/274, 282; 348/39, 143, 159
See application file for complete search history.

(56) References Cited

U.S. PATENT DOCUMENTS

| | | | |
|---|---|---|---|
| 3,725,563 A | 4/1973 | Woycechowsky | |
| 4,667,236 A | 5/1987 | Dresdner | |
| 4,728,839 A | 3/1988 | Coughlan et al. | |
| 4,763,280 A | 8/1988 | Robinson et al. | |
| 4,821,209 A | 4/1989 | Hempel et al. | |
| 5,027,287 A | 6/1991 | Artigalas et al. | |
| 5,185,667 A | 2/1993 | Zimmermann | |
| 5,321,776 A | 6/1994 | Shapiro | |
| 5,359,363 A | 10/1994 | Kuban et al. | |
| 5,396,284 A | 3/1995 | Freeman | |
| 5,434,617 A | 7/1995 | Bianchi | |

(Continued)

FOREIGN PATENT DOCUMENTS

EP  1341383 A2  9/2003

(Continued)

OTHER PUBLICATIONS

Comaniciu, D., Ramesh, V. and Meer, P. "Real-Time Tracking of Non-Rigid Objects Using Mean-shirt," IEEE Computer Vision and Pattern Recognition, vol. 1 II, 2000, pp. 142-149.

(Continued)

*Primary Examiner* — Stephen Koziol
(74) *Attorney, Agent, or Firm* — Robert O. Groover; Seth A. Horwitz

(57) ABSTRACT

A system and method for providing privacy regions in a picture or video. In one example embodiment, a camera is provided which has a lens system and detector, image processing circuitry, compression and formatting circuitry, and control circuitry. Images or video taken from the camera are preferably corrected for distortion (such as that introduced by an anamorphic lens system) and sent to an operator's workstation, where a privacy region is defined. The privacy region is merged with the rest of the image, whether constant or dynamic, and displayed. Other processing, such as object tracking and alarms, can also be implemented at varying points in the process.

19 Claims, 8 Drawing Sheets

U.S. PATENT DOCUMENTS

| | | | |
|---|---|---|---|
| 5,495,292 | A | 2/1996 | Zhang |
| 5,666,157 | A | 9/1997 | Aviv |
| 5,684,937 | A | 11/1997 | Oxaal |
| 6,049,281 | A | 4/2000 | Osterwell |
| 6,147,709 | A | 11/2000 | Martin et al. |
| 6,215,519 | B1 * | 4/2001 | Nayar et al. .................. 348/159 |
| 6,243,099 | B1 | 6/2001 | Oxaal |
| 6,344,852 | B1 | 2/2002 | Zhu |
| 6,509,926 | B1 | 1/2003 | Mills et al. |
| 6,724,421 | B1 | 4/2004 | Glatt |
| 6,757,434 | B2 | 6/2004 | Miled et al. |
| 6,763,068 | B2 | 7/2004 | Oktem |
| 7,058,239 | B2 * | 6/2006 | Singh et al. .................. 382/284 |
| 7,260,241 | B2 * | 8/2007 | Fukuhara et al. ............. 382/103 |
| 7,366,359 | B1 | 4/2008 | Davey et al. |
| 7,450,165 | B2 | 11/2008 | Ahiska |
| 7,528,881 | B2 | 5/2009 | Ahiska |
| 7,529,424 | B2 | 5/2009 | Ahiska |
| 7,894,531 | B1 | 2/2011 | Cetin et al. |
| 2003/0128756 | A1 | 7/2003 | Oktem |
| 2003/0142853 | A1 * | 7/2003 | Waehner et al. ............. 382/118 |
| 2004/0119819 | A1 * | 6/2004 | Aggarwal et al. ............ 348/143 |

FOREIGN PATENT DOCUMENTS

| | | |
|---|---|---|
| WO | 02062056 A1 | 8/2002 |

OTHER PUBLICATIONS

Y. Yardimci, I. Yilmaz, A. E. Cetin, "Correlation Tracking Based on Wavelet Comain Information," Proceedings of SPIE vol. #5204, San Diego, Aug. 5-7, 2003.

A. M. Bagci, Y. Yardimci, A. E. Cetin, "Moving Object Detection Using Adaptive Subband Decomposition and Franctional Lower-Order Statistics in Video Sequences," Signal Processing, 82 (12): 1941-1947, Dec. 2002.

C. Stauffer, W. Grimson, "Adaptive Background Mixture Models for Real-Time Tracking," Proc. IEEE CS Conf. on Computer Vision and Pattern Recognition, vol. 2, 1999, pp. 246-252.

Collins, Lipton and Kanade, "A System for Video Surveillance and Monitoring," in Proc. American Nuclear Society (ANS) Eighth International Topical Meeting on Robotics and Remote Systems, Pittsburgh, PA, Apr. 25-29, 1999.

AUBE, 12th International Conference on Automatic Fire Detection, 2001.

X. Zhou, R. Collins, T. Kanade, and P. Metes, "A Master-Slave System to Acquire Biometric Imagery of Humans at Distance", ACM International Workshop on Video Surveillance, Nov. 2003.

* cited by examiner

IMAGE PROCESSING OF REGIONS IN A WIDE ANGLE VIDEO CAMERA

CROSS REFERENCE TO RELATED APPLICATIONS

This application claims priority from provisional patent application 60/586,204, filed on Jul. 8, 2004, which is hereby incorporated by reference. It is a continuation of non-provisional application Ser. No. 11/178,232 filed Jul. 8, 2005, which is now U.S. Pat. No. 7,366,359 issued Apr. 29, 2008, which is hereby incorporated by reference.

FIELD OF THE INVENTION

The present inventions relate generally to image processing in a wide angle video camera, and more specifically to maintaining privacy regions in such a system.

BACKGROUND AND SUMMARY OF THE INVENTION

Video surveillance systems apply image processing to enhance or obscure visual information as necessary. It is useful to be able to define the extents within which image processing operations should take place; for example moving region detection and object tracking software may define the bounding box of a suspicious object and use it to direct enhancement processing to the appropriate area of the image. Alternatively many surveillance systems require selected regions to be marked as private. A private region is an area that is not output from the camera and may not necessarily be viewed or recorded. Example areas requiring privacy might include changing rooms in shops or the contents of computer screens. These regions should be obscured.

Privacy may be implemented by masking off areas that should not be viewed either with mechanical obstructions blocking the line of sight of the camera or by electronically blanking the video signal at appropriate times, as discussed in U.S. Pat. No. 6,049,281, which is hereby incorporated by reference. It is however, much more difficult to implement privacy regions in surveillance systems that use standard pan-tilt-zoom (PTZ) cameras. The difficulties arise from the need to block out a region of captured video, where that region must stay fixed with respect to the world independent of the state of pan, tilt, or zoom of the camera. Many implementations rely on a mechanical measurement of the orientation of the camera and under rapid movement the measurement may lag the movement of the camera, which results in the private regions becoming momentarily visible. For example, U.S. Pat. No. 6,509,926, which hereby is incorporated by reference, discusses a unit for generating the azimuth and elevation angles of a camera and lens.

A new class of camera replaces the mechanical PTZ mechanisms by a wide-angle optical system and image processing (as discussed in U.S. Provisional Application 60/467,588, which is hereby incorporated by reference). This type of camera monitors a wide field of view and selects regions from it to transmit to a base station; in this way it emulates the behavior of a mechanical PTZ camera. The wide-angle optics introduces distortion into the captured image and processing algorithms are used to correct the distortion and convert it to a view that has a similar view as a mechanical PTZ camera. This type of camera may be used to improve the processing of selected regions because a wide field is always captured by the camera and there is no need for mechanical measurement.

There is a need in the art for a way to provide obscured regions of images or video, whether in a still camera or a PTZ camera.

Image Processing of Regions in a Wide Angle Video Camera

In one example embodiment, the present innovations include a system and method for capturing images and providing a privacy region (or other defined region for processing). In preferred embodiments, the present innovations include a camera for capturing wide angle images, correcting those images, allowing an operator or other means to select a region for processing (preferably for privacy obfuscation, but potentially for other processing such as object tracking or alarms), and displaying the image or video with the privacy regions obscured. The present innovations can be performed in a number of varying process flows, including but not limited to correction before or after the privacy region is defined, and correction before or after the privacy region is merged with the rest of the image or video. Further, preferred embodiments allow other processing (such as object tracking or alarms, for example) to be performed at varying points in the process, as needed in a given implementation. These and other innovative aspects of the present inventions are described more fully below.

BRIEF DESCRIPTION OF THE DRAWINGS

The disclosed inventions will be described with reference to the accompanying drawings, which show important sample embodiments of the invention and which are incorporated in the specification hereof by reference, wherein.

DETAILED DESCRIPTION OF THE PREFERRED EMBODIMENTS

The numerous innovative teachings of the present application will be described with particular reference to the presently preferred embodiment (by way of example, and not of limitation).

Figure 1:
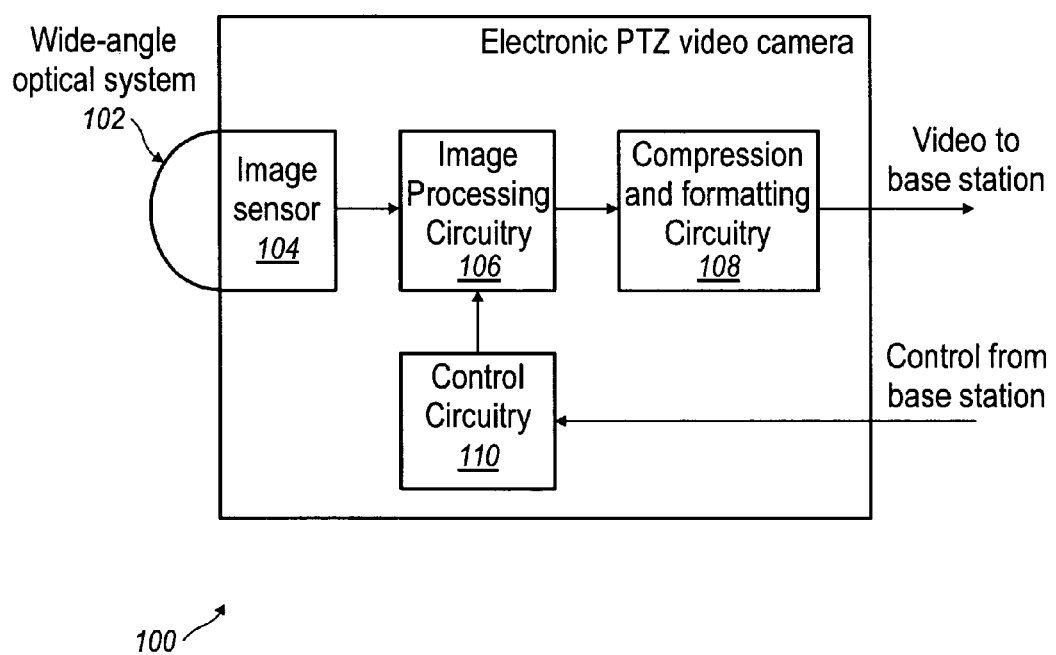
FIG. 1 shows a camera system consistent with implementing a preferred embodiment of the present innovations.

FIG. 1 shows one example implementation of a preferred embodiment, this example being described in terms of a video camera 100. The camera 100 includes an optical system 102 that communicates with image sensor 104. In preferred embodiments, optical system 102 is a wide angle, anamorphic, or panoramic lens system (for example), possibly including multiple lenses, holographic elements, or other elements. Sensor 104 passes a captured image to image processing circuitry 106 for processing, such as correction of any distortions of the image caused by the optical system 102

(though other processing is also possible). For example, arbitrarily complex distortions can be corrected, as described in U.S. provisional patent application 60/467,705, which is hereby incorporated by reference. In preferred embodiments, the distortion is corrected though the use of tables that define the necessary warping, such as that caused by the lens system or other known factors.

The corrected image is preferably compressed and formatted by circuitry 108 before being output, such as to a base station (not shown) for monitoring. The camera 100 is preferably controlled by the base station through control circuitry 110. It is noted that other architectures and camera arrangements can implement the present innovations, and the example of FIG. 1 is only illustrative and not limiting.

In preferred embodiments, the present innovations include capability to select a region of a captured image (such as one or more frames of video), whether processed or not, and to obscure that region or perform other processing on that region. In preferred embodiments, the selected region can be obscured to provide a privacy region that cannot be viewed at an output of the image. In one example implementation, the innovative camera captures an image, such as wide angle video (but not limited thereto), and corrects the wide angle view to create a corrected view (i.e., not distorted view) that is sent to an operator. The operator (or specially designed software) defines a region to be obscured, for example, by using a mouse to select a shape that covers pixels of the image.

In preferred implementations, the defined region is projected onto an uncorrected view of the image, such that the region is distorted according to the distortions introduced, for example, by the lens system 102. The region is obscured, such as by replacing each pixel of the defined region with blanket pixels of the same color and intensity. This image, with the defined region obscured, is then corrected to form a second corrected wide angle view, which can be output with the privacy region not visible to viewers. This example implementation is not intended to limit the applicability of the present innovations, which can be implemented in other ways, consistent with the ideas described herein.

In other embodiments, some processing is performed at different steps, such as object tracking (for example). This and other examples are described more fully below.

In preferred embodiments, a private region is defined in the context of the corrected view because that is the view displayed on the operator's console. It is noted that, though the examples described herein refer to corrected views being sent to the operator and the corrected view is the context in which a privacy region (or other processing region) is preferably defined, the present innovations are also applicable in situations where an uncorrected view (or a view at any other state of processing) is used as context for selection of a privacy region or other processing region.

Figure 2:
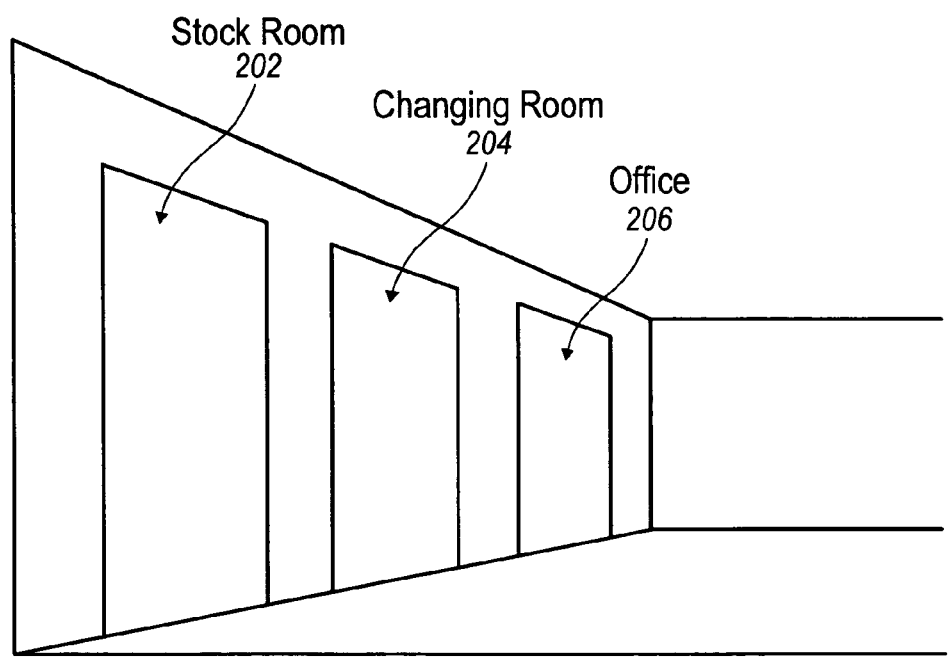
FIG. 2 shows a perspective view of a scene in which the present innovations may be implemented.

FIG. 2 shows the operator's view of a typical situation where the entrance to a stock room and an office must be monitored but a changing room must be left private. In this example, three doors are visible to the operator, who has received a corrected view from a camera such as that described in FIG. 1. Stock room 202, changing room 204 and office 206 are all visible prior to defining the privacy region.

Figure 3:
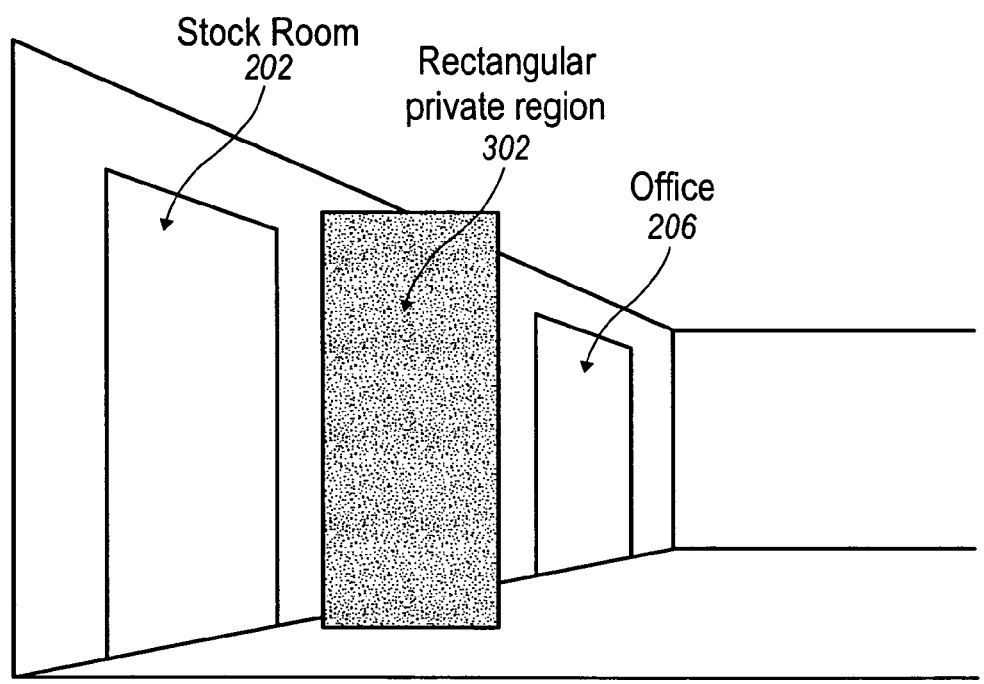
FIG. 3 shows a corrected view of a scene with a privacy region consistent with implementing a preferred embodiment of the present innovations.

FIG. 3 shows a rectangular private region 302 positioned by the operator to obscure the entrance to the changing room 204. In preferred embodiments, this privacy region 302 can be of any shape and can be defined in a number of ways, such as by simple click-and-drag with a mouse, or other ways including but not limited to pixel selection of any defined region of any shape.

Figure 4:
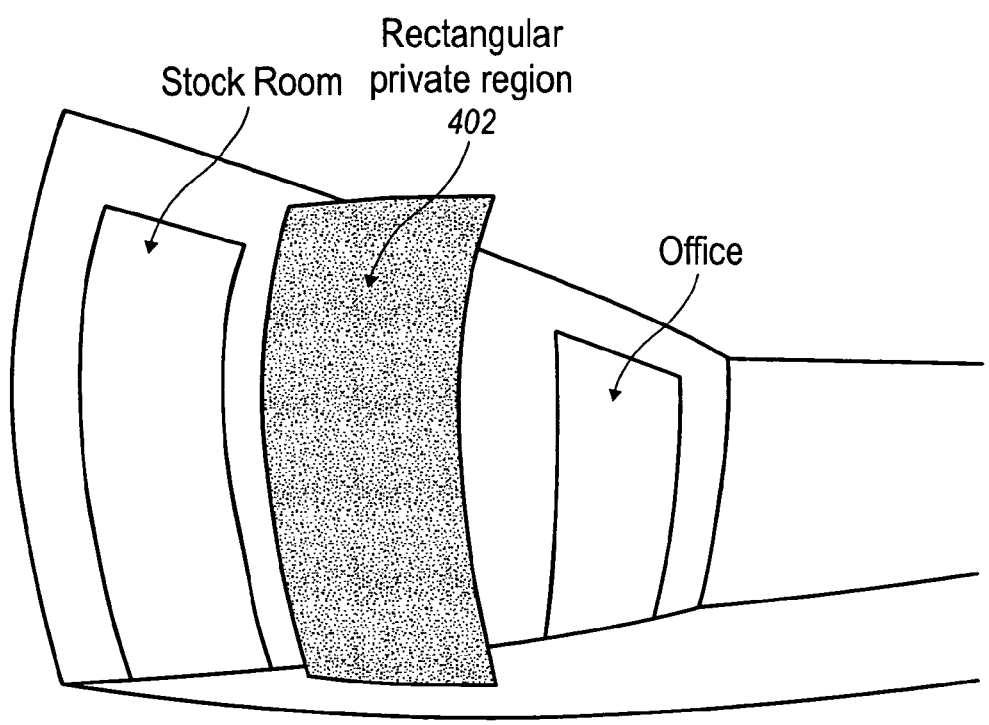
FIG. 4 shows a distorted view of a scene with a privacy region consistent with implementing a preferred embodiment of the present innovations.

In preferred embodiments, the privacy region 302 is inverse transformed to form a distorted privacy region 402 as shown in FIG. 4. In some embodiments, the distorted privacy region 402 is projected into the distorted image as shown in FIG. 4. In other embodiments, the privacy region is first corrected (as is the rest of the image, though preferably separately) prior to merging or projecting the privacy region back into the main image.

In either case, a corrected image including a corrected privacy region is obtained. It is noted that the order in which these steps are implemented can vary within the scope of the innovations presented herein. For example, the privacy region can be selected on a corrected view, or an uncorrected view, and the merging of the privacy region and the larger contextual image can happen at different points in the process.

In preferred embodiments, the privacy region (as selected in a non-distorted image, for example) is projected into the distorted image so that private pixels can be obscured. What was, for example, a rectangular shape in the operator's view (of the corrected, non-distorted view) becomes a more complex shape with possibly curved sides in the distorted view. In preferred embodiments, the projection is done by the same tables used to correct the image. The projection may be applied to individual pixels, to triangles that tessellate the defined region, or any other shape that tiles to appropriately cover the region. If triangles are used, then a 3D graphics pipeline may be an appropriate way of projecting from corrected view to distorted view.

Figure 6:
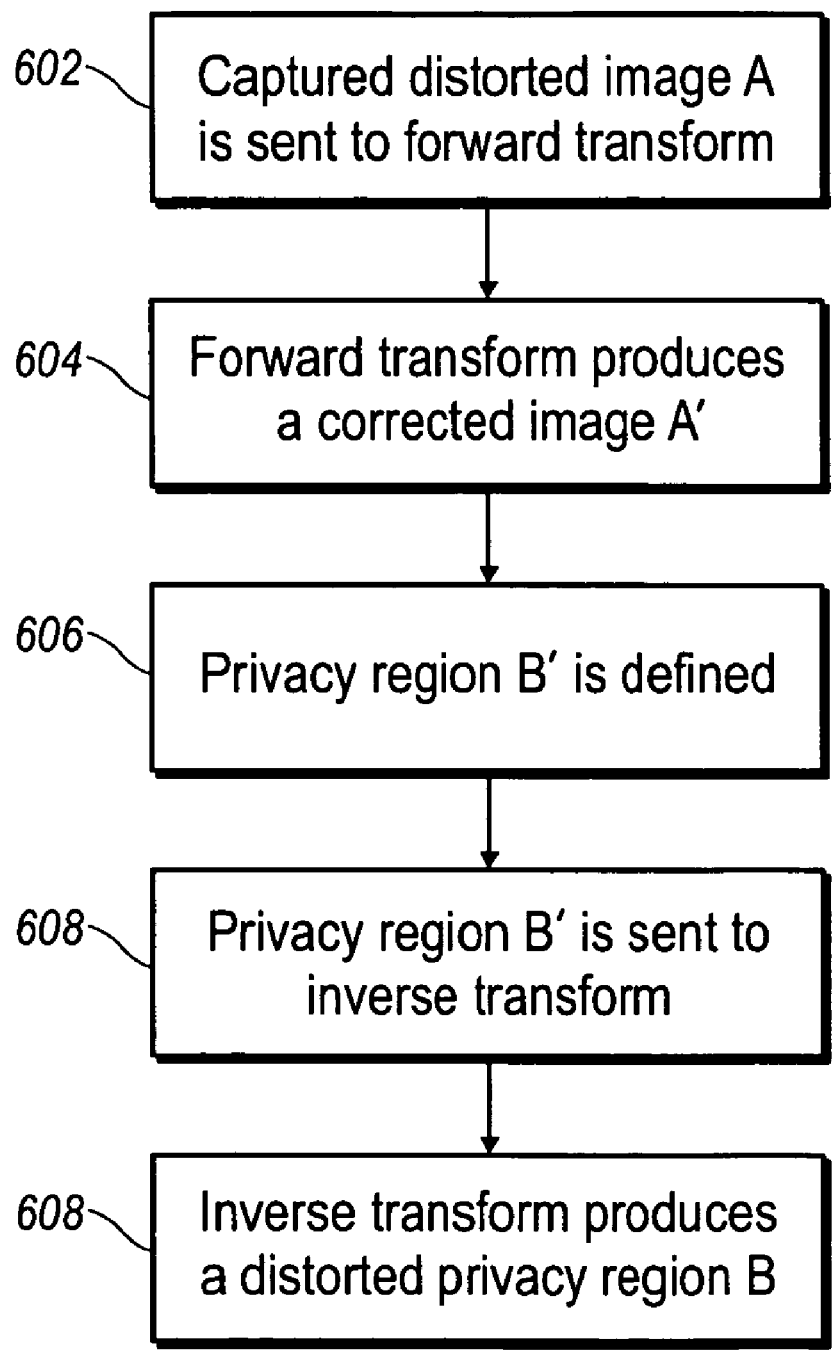
FIG. 6 shows a process flow for implementing a preferred embodiment of the present innovations.

FIG. 6 shows an example process flow for implementing one preferred embodiment of the present innovations. A captured distorted image A (for example, from a fisheye or other anamorphic lens or lens system) is sent to forward transform (step 602). Forward transform (such as can be implemented in image processing circuitry 106, for example, though such processing could occur outside the camera, such as on a server in communication with the camera) produces a corrected image A' (step 604). The corrected image A' used at this stage can be, for example, real-time video or a still image. As described in the references cited in this text, the forward transform typically performs a mapping from the distorted image to the corrected image. Since this is preferably a one-to-one mapping (at least locally), it is reversible.

Next, a privacy region B' is defined (step 606), for example, by an operator who receives the corrected image A' at a workstation, or by software designed to select and define such privacy regions. The privacy region B' is similar to that depicted in FIG. 3 as region 302, or region 502 of FIG. 5. Since, in preferred embodiments, the region is defined on the corrected image, it is already in the perspectively corrected domain. (It is noted that other types of transforms are also possible, and perspective correction is not the only context in which the present innovations can be implemented.) Privacy region B' is then sent to inverse transform, which is preferably the functional complement of the forward transform mentioned above (step 608). Inverse transform can be implemented, for example, in circuitry 106, or in remote locations. Inverse transform produces a distorted privacy region B (step 608). In preferred embodiments, since privacy region B' is constant, distorted privacy region B is also constant. Also in preferred implementations, forward and inverse transforms can be constant, or can be optionally changed dynamically if the operator wishes to emulate the different viewpoints which would be provided by a conventional PTZ (pan-tilt-zoom) camera.

Figure 7:
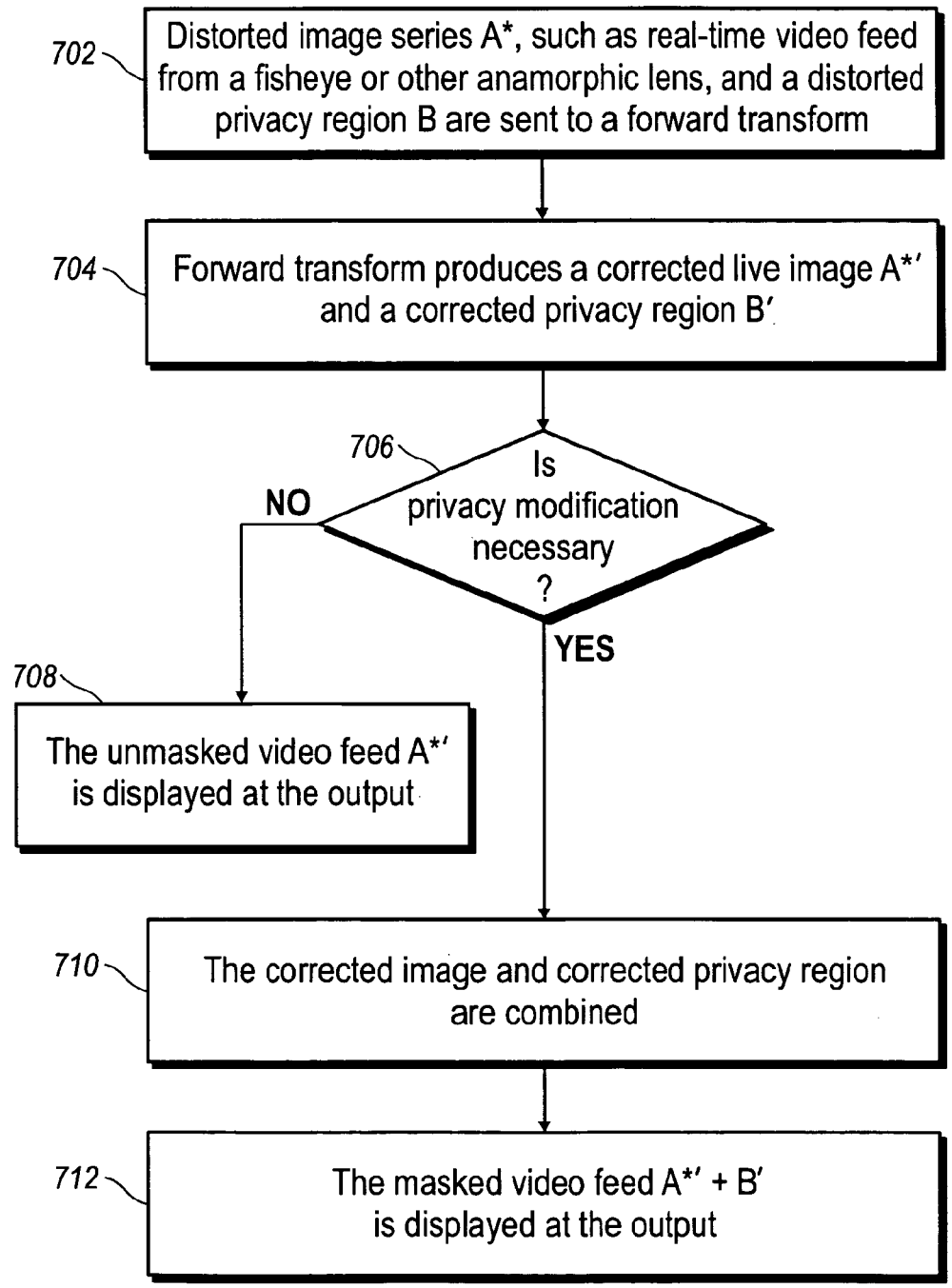
FIG. 7 shows a process flow for implementing a preferred embodiment of the present innovations.

FIG. 7 shows an example process flow consistent with the present innovations, wherein the privacy region B has already been defined, preferably in the corrected domain as described in FIG. 6. In the example of FIG. 7, a video image including multiple images to form a series of images A* is used. Distorted image series A*, such as a real-time video feed from a fisheye or other anamorphic lens, and a distorted privacy region B are sent to a forward transform (step 702). (Note that this example assumes privacy region B is a constant image, though it could also be implemented as a series of images B*, such as would be useful in a PTZ camera.) Forward transform produces a corrected live image A*' and a corrected privacy region B' (step 704).

After the merging step, a condition test is performed to determine whether conditions exist which make privacy modification unnecessary (step 706). If the privacy modifications are unnecessary (for example, if an alarm has occurred or if a high level supervisor calls for access to restricted data, or other conditions occur), then the unmasked video feed A*' is displayed at the output (step 708). If the privacy modifications are necessary, then the corrected image and corrected privacy region are combined (step 706) or merged, such as by a masking operation done in masking logic. This process can also be referred to as projecting the privacy region B' onto the image or images A' or A*'. This operation can be performed in a variety of ways within the context of the present innovations. The end result is a masked video feed A*'+B'. Next, the masked video feed A*'+B' is displayed at the output (step 712).

In one class of sample embodiments, the present innovations are combined with object tracking capability. In these examples, it is preferable to feed the unmasked (and preferably uncorrected) video feed A* directly to object tracking circuitry, such as circuitry 106. Alternately, object tracking can be performed by other means, such as by an external server. Further, the tracking (or alarm, or other processing) can be performed on the corrected or on uncorrected versions of the images or video.

Note that the forward transform may have changed since the distorted privacy region B was defined, and the above process flow will still work properly.

Figure 8:
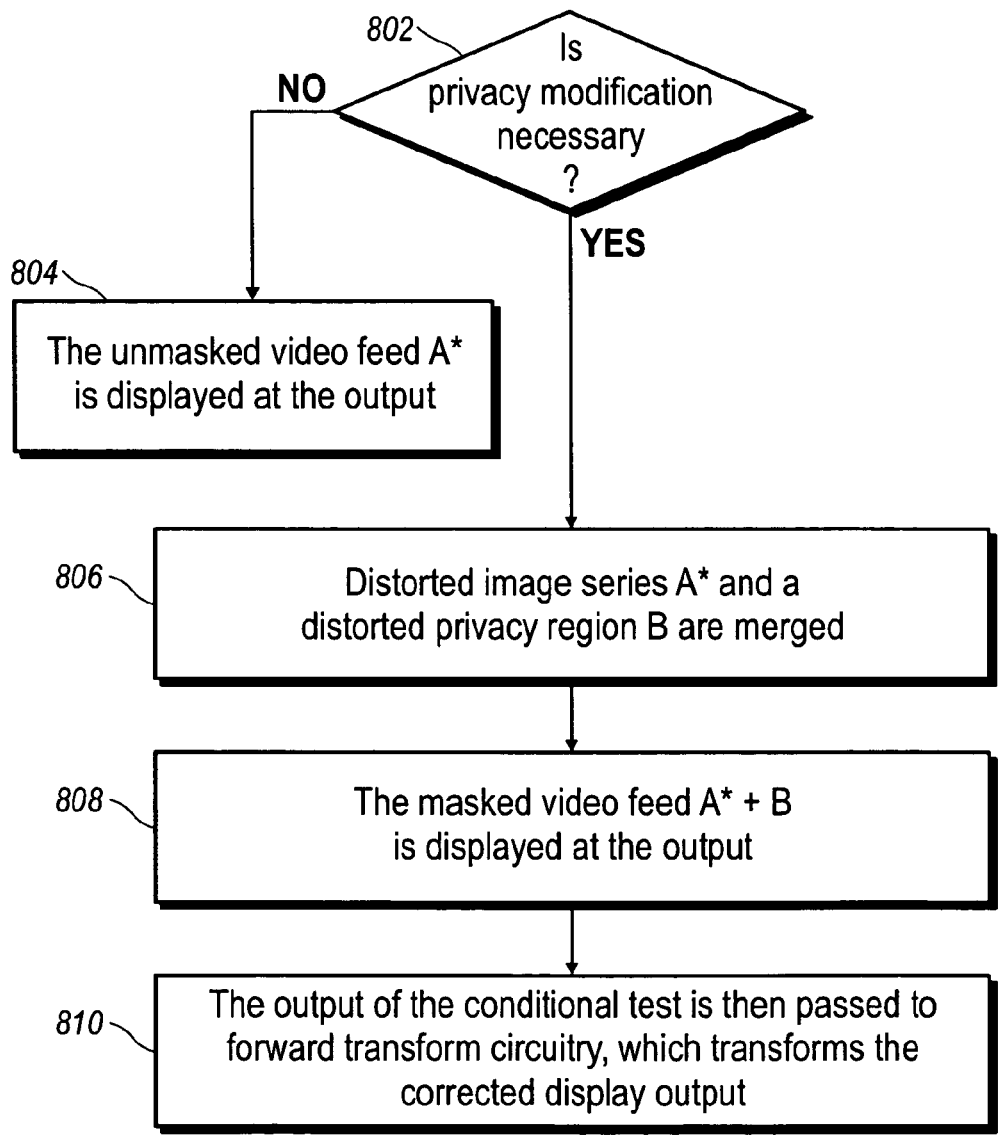
FIG. 8 shows a process flow for implementing a preferred embodiment of the present innovations.

FIG. 8 shows a set of process steps consistent with implementing a preferred embodiment of the present innovations. This example shows a process wherein the privacy region B has already been defined, preferably in the corrected domain as described in FIG. 6. In the example of FIG. 8, a video image including multiple images to form a series of images A* is used. A conditional test is performed (step 802) wherein it is determined whether conditions exist which make privacy modification unnecessary. If the privacy modifications are unnecessary (for example, if an alarm has occurred or if a high level supervisor calls for access to restricted data, or other conditions occur), then the unmasked distorted video feed A* is displayed at the output (step 804). If the privacy modifications are necessary, then distorted image series A*, such as a real-time video feed from a fisheye or other anamorphic lens, and a distorted privacy region B are merged (step 806) to form a masked video feed A*+B. Then the distorted masked video feed A*+B is displayed at the output (step 808).

The output of the conditional test is then passed to forward transform circuitry, which transforms the corrected display output (step 810). Thus, depending on the results of the conditional test, either corrected output A*' or A*'+B' is output.

In preferred embodiments, after selection of the private region, the XY positions of the private region in the distorted view may be recorded in a list or in a bitmap and the corresponding pixels in the distorted image obscured for each subsequent frame. It is advantageous to store the position of pixels defining the private region in the distorted image coordinate space because it is constant and removes the need to track the position of the private region in the corrected view as the camera pans, tilts, or zooms. It is noted, however, that this is not necessary, and the present innovations can be practiced where the private region is selected, defined, and/or stored in either the distorted or corrected image space. In other contexts, where perspective correction or distortion correction are not used but where other processing is done on the video, the private regions can be stored in either the pre-processed format or a post-processed format.

Figure 5:
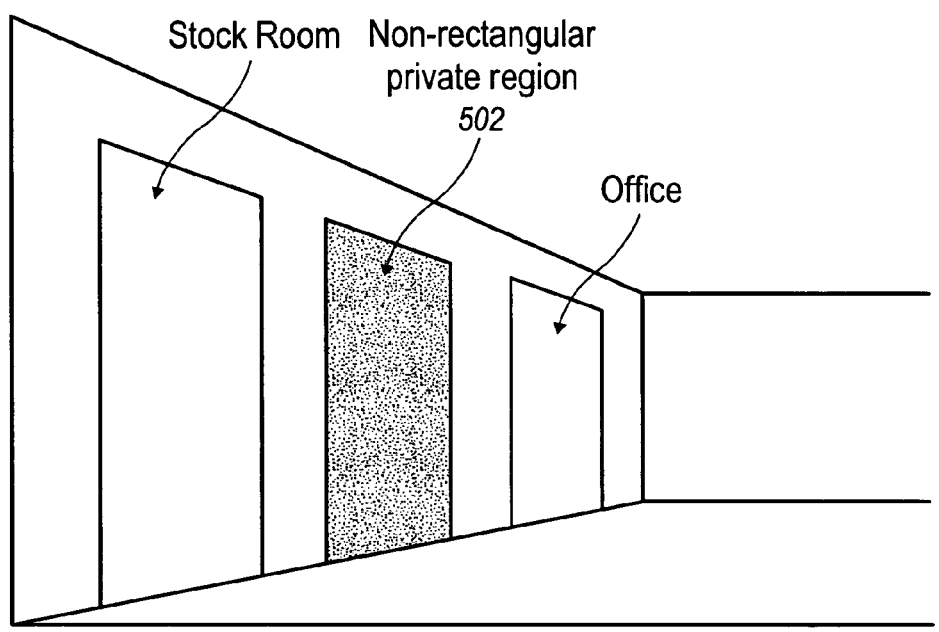
FIG. 5 shows a perspective view of a scene with a privacy region consistent with implementing a preferred embodiment of the present innovations.

In one example embodiment the selected region is not limited to a rectangle but can be any shape, as shown in FIG. 5. In this example a non-rectangular shape covers the entrance to the changing room more efficiently. In other embodiments, other shapes can be implemented as privacy zones.

In another example embodiment it is advantageous to obscure private regions after some processing has been completed. Examples of processing that might usefully be done before data in a private region is obscured include (but are not limited to) motion detection and object tracking. This technique enables alarms to be signaled when movement is detected in a private region even though the private region is not visible at the base station. It is also beneficial for object tracking if tracking can continue without interruption, if the object passes through a private region.

In another example embodiment it is advantageous to obscure private regions when sent to one viewer, but not to another. For example, it may be appropriate for some operators to be able to view the contents of computer screens that are obscured to other operators. In this embodiment the corrected view is formed twice, first with the private regions unobscured, then the private region of distorted data is obscured and a new corrected view formed. If the formation of the corrected view is computationally expensive an optimization is possible in which the corrected view is formed once and the obscuration applied to the corrected image.

To obscure a private region by writing to the corrected view instead of the uncorrected view the private region should be projected back to the distorted view as already disclosed and as before the position of the private data is best held in the distorted image space. For each frame the private region is projected forward to the corrected view and used to obscure the corresponding data in the corrected view.

In a further embodiment the private region is partially obscured instead of fully obscured. For example, instead of overwriting the private region with an opaque color the pixels within it may be modified such that the general shape of a person may be discerned but recognizable features are obscure.

The control of privacy can be programmatic, meaning that the contents of the private region are analyzed and privacy applied when appropriate. For example objects that move within the private region can be obscured, while objects that remain constant are made visible. Moving regions of the video can be determined by estimating the background scene of the video. In one example embodiment, the camera first segments each video image of the captured digital video into foreground and background regions using the red, green, and blue (RGB) color channels of the video or using the YUV (luminance and chrominance) channels. Foreground-background separation can be achieved in many ways (see e.g. C. Stauffer and W. Crimson "Adaptive background mixture models for real-time tracking," IEEE Computer Vision and Pattern Recognition Conference, Fort Collins, Colo., Jun. 1999). The background of the scene is defined as the union of all stationary objects and pixels, and the foreground consists of transitory objects. A simple approach for estimating the background image is to average all the past image frames of the video (e.g., the article "A System for Video Surveillance and Monitoring," in Proc. American Nuclear Society (ANS) Eighth International Topical Meeting on Robotics and Remote Systems, Pittsburgh, Pa., Apr. 25-29, 1999 by R. Collins, A. Lipton and T. Kanade). The public domain article by Collins et al describe a recursive way of estimating the background of the scene in which the current background image is formed by linearly combining the previous background image and the current video image. This linear combination process is also called alpha-blending in computer graphics literature. Statistical background estimation method is described in the article by C. Stauffer et al. Pixels of the foreground objects are estimated by subtracting the current image from the estimated background image. Moving blobs and objects are constructed from the pixels by performing a connected component analysis, which is a well-known image processing technique (see e.g., Fundamentals of Digital Image Processing by Anil Jain, Prentice-Hall, N.J., 1988).

Once the moving regions or blobs are determined then an object tracking process is started. An object tracking system and method is described in U.S. patent application entitled "Tracking Moving Object in Video Using Wavelet Domain Information," by Ahmet Enis Cetin, Yavuz Ahiska, application Ser. No. 10/924,279 filed Aug. 23, 2004, hereby incorporated by reference.

The background estimation technique is also useful in detecting objects left in private regions. In another example static or non-moving (also referred to as constant) objects are obscured but the moving objects displayed; this is useful when moving people are tracked moving in front of computers displaying sensitive information. In another example a car number plate may be recognized as such and obscured. The control of privacy may also be alarm based. For example, when an alarm is triggered all private regions may be disabled to make everything visible, or just the private region within which the alarm was triggered.

Using the same projection technique disclosed above other types of image processing may be direction to specified regions. For example, object tracking may be limited to regions that are defined by the operator using the corrected view.

It should be clear to those skilled in the art that the techniques disclosed above might be applied to more than one region within a camera. The foregoing has described methods for the implementation of image processing within regions that are given for illustration and not for limitation. Thus the invention is to be limited only by the appended claims.

Further information on the state of the art can be found in the following sources, all of which are hereby fully incorporated by reference: U.S. Pat. No. 6,049,281, entitled "Method and apparatus for monitoring movements of an individual", which is hereby incorporated by reference; U.S. Pat. No. 6,509,926, entitled "Surveillance apparatus for camera surveillance system", which is hereby incorporated by reference; U.S. Provisional Application Ser. No. 60/467,705, entitled "Correction of optical distortion by image processing", which is hereby incorporated by reference; U.S. Provisional Application Ser. No. 60/467,588, entitled "Multiple View Processing in Wide-Angle Video Camera", which is hereby incorporated by reference; U.S. Provisional Application Ser. No. 60/467,643, entitled "Multiple Object Processing in Wide-Angle Video Camera", which is hereby incorporated by reference; U.S. Provisional Application Ser. No. 60/467,644, entitled "Method of Simultaneously Displaying Multiple View for Video Surveillance", which is hereby incorporated by reference; U.S. patent application entitled "Tracking Moving Object in Video Using Wavelet Domain Information," Ser. No. 10/924,279 filed Aug. 23, 2004.

According to a disclosed class of innovative embodiments, there is provided: A method of manipulating an image, comprising the steps of: capturing a wide angle view; correcting the wide angle view to create a first corrected view; defining a first region of said corrected view to be obscured; projecting the first region onto the wide angle view; obscuring the first region in the wide angle view; correcting the wide angle view with the first region to create a second corrected view; outputting the second corrected view.

According to a disclosed class of innovative embodiments, there is provided: A method of manipulating a video, comprising the steps of: capturing a wide angle view; correcting the wide angle view; defining a region of said wide angle view to be suitable for motion detection; projecting the motion detection region onto the wide angle view; analyzing the projected motion detection region for motion; outputting a corrected view.

According to a disclosed class of innovative embodiments, there is provided: A method of operating a wide angle video camera, comprising the steps of: capturing a wide angle view; correcting the wide angle view to form a corrected view; defining a region of the corrected view suitable for object tracking; projecting the object tracking region onto the wide angle view; analyzing the projected object tracking region for moving objects; outputting the corrected view.

According to a disclosed class of innovative embodiments, there is provided: A wide angle video camera, comprising: an input device for defining a region of a wide angle view suitable for image processing; first circuitry for projecting the region onto a version of the wide angle view; second circuitry for processing the region in the wide angle view; an output device for outputting a corrected view.

According to a disclosed class of innovative embodiments, there is provided: A method of operating a wide angle video camera, comprising the steps of: capturing a wide angle view; correcting the wide angle view; defining a region of said corrected view to be processed; projecting the processing region onto the wide angle view; storing the projected processing region; projecting the stored processing region onto the corrected wide angle view; processing the processing region within the corrected view; outputting the corrected view.

According to a disclosed class of innovative embodiments, there is provided: A method of manipulating an image, comprising the steps of: capturing a distorted wide angle view; correcting the wide angle view to create a corrected view; performing first processing of the corrected view; defining a privacy region in the corrected view; projecting the privacy region onto the distorted wide angle view.

According to a disclosed class of innovative embodiments, there is provided: A method of manipulating an image, comprising the steps of: capturing a wide angle view; correcting the wide angle view to create a corrected view; defining a first region of the wide angle view; projecting the first region onto the wide angle view to create a wide angle view with first region; performing first processing on the wide angle view with first region; projecting the first region onto the corrected view.

According to a disclosed class of innovative embodiments, there is provided: A method of manipulating an image, comprising the steps of: defining a privacy region in a corrected view of a wide angle image; projecting the privacy region onto an uncorrected view of the wide angle image; correcting the uncorrected view with the privacy region.

According to a disclosed class of innovative embodiments, there is provided: A method of manipulating an image, comprising the steps of: capturing a first distorted image; correcting the first distorted image to create a first corrected image; defining a region of the first corrected image; projecting the region onto the first distorted image to create a distorted region; storing the distorted region; capturing a second distorted image; applying the distorted region to the second distorted image; correcting the second distorted image with the distorted region to thereby create a second corrected image.

According to a disclosed class of innovative embodiments, there is provided: A method of manipulating an image, comprising the steps of: determining the pixels of a distorted wide angle image corresponding to a region of the distorted image after correction by the use of mapping tables that define the projection of the corrected image to the distorted image.

According to a disclosed class of innovative embodiments, there is provided: A computer program product on a computer readable medium comprising programming instructions for determining the pixels of a distorted wide angle image corresponding to a region of the distorted image after correction by the use of mapping tables that define the projection of the corrected image to the distorted image.

According to a disclosed class of innovative embodiments, there is provided: A method of manipulating an image, comprising the steps of: defining a first region of a view; testing to determine whether the first region is to be obscured; outputting a view with the first region obscured.

According to a disclosed class of innovative embodiments, there is provided: A method for monitoring views taken from wide angle lenses, comprising the actions of: receiving at least one distorted image; combining said distorted image with a distorted privacy mask, to thereby produce a distorted masked image; and transforming said distorted masked image to generate a less-distorted image for viewing.

According to a disclosed class of innovative embodiments, there is provided: A method for monitoring outputs from an anamorphic optical system, comprising the actions of: receiving at least one image which is defined within a first image geometry; combining said image with a privacy mask which is also defined within said first image geometry, to thereby produce a masked image which is defined within said first image geometry; transforming said masked image from first image geometry to a second image geometry, to thereby generate a corresponding masked image which is defined within said second image geometry; and transmitting said corresponding masked image for viewing.

Modifications and Variations

As will be recognized by those skilled in the art, the innovative concepts described in the present application can be modified and varied over a tremendous range of applications, and accordingly the scope of patented subject matter is not limited by any of the specific exemplary teachings given.

The references herein to video and still images is not limited to analog or video alone, and can be either variety or any other format or type of imaging technology.

As has been mentioned above, the examples given herein are only illustrative and are not intended to imply that these are the only ways to implement the present innovations. The order of the actions described herein, and the locations at which they are performed, can of course vary within the scope of the present innovations. These innovations are also applicable for other types of processing aside from those mentioned, beyond object tracking, privacy domains, and alarm triggering. Outside computer systems, such as servers, can be used for calculating many of the necessary functions, or the camera itself can be equipped with this capability.

Additional general background, which helps to show variations and implementations, may be found in the following publications, all of which are hereby incorporated by reference:

None of the description in the present application should be read as implying that any particular element, step, or function is an essential element which must be included in the claim scope: THE SCOPE OF PATENTED SUBJECT MATTER IS DEFINED ONLY BY THE ALLOWED CLAIMS. Moreover, none of these claims are intended to invoke paragraph six of 35 USC section 112 unless the exact words "means for" are followed by a participle.

What is claimed is:

1. A method of manipulating an image, comprising the steps of:
   capturing a wide angle non-perspective view on a fixed wide angle camera emulating a movable camera;
   correcting the non-perspective wide angle view to create a first corrected view;
   defining a first region of said corrected view to be obscured;
   projecting the first region onto the wide angle view;
   performing a motion detecting processing of the wide angle view and object tracking within the wide angle view;
   obscuring the first region in the wide angle view while continuing object tracking within the first region;
   correcting the wide angle view with the first region to create a second corrected view; and
   outputting the second corrected view.

2. The method of claim 1, wherein the first region is partially obscured.

3. The method of claim 1, wherein moving objects within the first region are obscured, but non-moving objects in the first region are not obscured.

4. The method of claim 1, wherein moving objects are determined by subtracting a current video image from an estimated background scene.

5. The method of claim 1, wherein the processing for obscuring or not obscuring the first region depends upon an activated alarm.

6. The method of claim 1, wherein the processing for obscuring or not obscuring the first region depends on the contents of the first region.

7. The method of claim 1, wherein non-moving objects are obscured within the first region.

8. The method of claim 1, wherein moving objects are not obscured within the first region.

9. A method of manipulating a distorted image view in a video feed, comprising the steps of:
   capturing a set of image frames using a wide angle fixed camera; correcting the wide angle view image frames to emulate a pan, tilt, and zoom camera;
   defining a first region of said wide angle view to be suitable for motion detection;
   defining a second region of said wide angle view to be suitable for obscuring;
   analyzing the first region for motion detection;
   obscuring at least part of the second region; and
   outputting a corrected image frame view.

10. The method of claim 9, wherein non-moving objects in the second region are obscured, and wherein moving objects in the second region are not obscured.

11. The method of claim 9, wherein moving objects in the second region are obscured, and wherein non-moving objects in the second region are not obscured.

12. The method of claim 9, wherein non-moving objects are determined by background estimation.

13. The method of claim 9, wherein moving objects are determined by subtracting an image from an estimated background scene.

14. The method of claim 9, wherein the second region is wholly a portion of the first region.

15. The method of claim 1, wherein a non-transitory computer-readable medium is provided having stored instructions thereon that, when executed, direct a computing apparatus to control said fixed wide angle camera to perform said capturing step, execute said correcting, defining, projecting, performing, obscuring and correcting steps, and control a display device to perform said outputting step.

16. The method of claim 1, wherein a non-transitory computer-readable medium is provided having stored instructions thereon that, when executed, direct a computing apparatus to perform said defining step such that the first region is partially obscured.

17. The method of claim 1, wherein a non-transitory computer-readable medium is provided having stored instructions thereon that, when executed, direct a computing apparatus to perform said defining step such that moving objects within the first region are obscured, but non-moving objects in the first region are not obscured.

18. The method of claim 9, wherein a non-transitory computer-readable medium is provided having stored instructions thereon that, when executed, direct a computing apparatus to control said fixed wide angle camera to perform said capturing step, perform said defining, analyzing and obscuring steps, and control a display device to perform said outputting step.

19. The method of claim 9, wherein a non-transitory computer-readable medium is provided having stored instructions thereon that, when executed, direct a computing apparatus to perform said obscuring step such that moving objects in the second region are obscured, and non-moving objects in the second region are not obscured.

* * * * *